US006818712B2

(12) United States Patent
Mealares et al.

(10) Patent No.: US 6,818,712 B2
(45) Date of Patent: Nov. 16, 2004

(54) SUPPORTED POLYMERISATION CATALYSTS

(75) Inventors: Christel Marie-Claude Mealares, Martigues (FR); Michael John Taylor, Sunbury-on-Thames (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/333,125

(22) PCT Filed: Jul. 11, 2001

(86) PCT No.: PCT/GB01/03109

§ 371 (c)(1),
(2), (4) Date: Jan. 16, 2003

(87) PCT Pub. No.: WO02/06357

PCT Pub. Date: Jan. 24, 2002

(65) Prior Publication Data

US 2003/0166801 A1 Sep. 4, 2003

(30) Foreign Application Priority Data

Jul. 17, 2000 (GB) .............................................. 0017547

(51) Int. Cl.$^7$ .................................................. C08F 4/42
(52) U.S. Cl. ....................... 526/160; 526/127; 526/943; 526/129; 526/131
(58) Field of Search ................................ 526/127, 160, 526/943, 129, 131

(56) References Cited

U.S. PATENT DOCUMENTS 5,783,512 A * 7/1998 Jacobsen et al. ............ 502/124
5,807,938 A * 9/1998 Kaneko et al. .............. 526/160
6,458,982 B1 * 10/2002 Schottek et al. .............. 556/53

FOREIGN PATENT DOCUMENTS

WO   WO 98/27119   6/1998

* cited by examiner

Primary Examiner—Ling Siu Choi
(74) Attorney, Agent, or Firm—Finnegan, Henderson, Farabow, Garrett and Dunner, L.L.P.

(57) ABSTRACT

Supported ionic metallocene catalyst systems may be prepared by a method comprising the following steps: i) mixing together in a suitable solvent: a) an organometallic compound, and b) an ionic activator comprising a cation and an anion; ii) addition of the mixture from step (i) to a support material; iii) addition of a metallocene complex in a suitable solvent; iv) further addition of an organometallic compound in a suitable solvent; and v) removal of the solvent. The preferred supported catalysts comprise a constrained geometry metallocene complex for example (t-butylamido) (tetramethyl-$\eta^5$-cyclopentadienyl) dimethyl silanetitanium-$\eta^4$-1,3-pentadiene and are particularly suitable for the polymerisation of ethylene or the copolymerisation of ethylene and α-olefins having from 3 to 10 carbons in the gas phase. The supported metallocene catalysts of the present invention show improved productivity compared to supported ionic metallocene catalyst systems of the prior art particularly when used in the gas phase.

22 Claims, No Drawings

1

SUPPORTED POLYMERISATION CATALYSTS

BACKGROUND OF THE INVENTION

The present invention relates to supported catalysts suitable for the polymerisation of olefins and in particular to supported metallocene catalysts providing advantages for operation in gas phase processes.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis(cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or compounds based on boron compounds. Examples of the latter are borates such as trialkyl-substituted ammonium tetraphenyl- or tetrafluorophenyl-borates. Catalyst systems incorporating such borate activators are described in EP 561479, EP 418044 and EP 551277.

The above metallocene complexes may be used for the polymerisation of olefins in solution, slurry or gas phase. When used in the gas phase the metallocene complex and/or the activator are suitably supported. Typical supports include inorganic oxides eg. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

A preferred gas phase process for polymerising olefins in the presence of a metallocene catalyst is one operating in a fluidised bed. In such processes the molecular weight of the polyolefin produced by the metallocene complex is determined by the competing rates of chain propagation, chain termination and chain transfer. These rates are in turn determined by the intrinsic kinetics of the catalyst and the reaction environment. In order to produce commercially interesting polyolefins the catalysts must make a high molecular weight polymer. Furthermore at commercial reactor conditions the catalyst must make a molecular weight that exceeds that of commercially interesting polymers such that the molecular weight can be controlled at the desired value with a chain transfer agent such as hydrogen.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with a trialkylaluminium compound followed by subsequent treatment with the support and the metallocene. When used in the gas phase such supported catalysts are extremely active but the molecular weight of the produced polymer is lower than that required for commercial operation.

WO 98/27119 also describes a method for activating a substantially inactive catalyst precursor comprising (a) an ionic compound comprising a cation and an anion containing at least one substituent comprising a moiety having an active hydrogen, (b) a transition metal compound and optionally, (c) a support by treatment with an organometallic compound thereby forming an active catalyst.

Various methods have been utilised to prepare supported catalysts of this type. For example WO 98/27119 describes several methods of preparing the supported catalysts disclosed therein in which the support is impregnated with the ionic compound. The volume of the ionic compound may correspond from 20 volume percent to greater than 200 volume percent of the total pore volume of the support. In a preferred preparative route the volume of the solution of the ionic compound does not exceed substantially, and is preferably equal to, the total pore volume of the support. Such methods of preparation may be referred to as incipient precipitation or incipient wetness techniques.

We have now developed an improved method which may be used to prepare supported metallocene catalyst systems resulting in increased productivities particularly when used in the gas phase.

SUMMARY OF THE INVENTION

Thus according to the present invention there is provided a method for the preparation of a supported metallocene catalyst system said method comprising the steps of:
 (i) mixing together in a suitable solvent
 (a) an organometallic compound, and
 (b) an ionic activator comprising a cation and an anion,
 (ii) addition of the mixture from step (i) to a support material,
 (iii) addition of a metallocene complex in a suitable solvent,
 (iv) further addition of an organometallic compound in a suitable solvent, and
 (v) removal of the solvent.

DETAILED DESCRIPTION OF THE

Suitable solvents for use in the present invention include lower alkanes eg isohexane or aromatic solvents eg—toluene.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic activators are those wherein the cation of the ionic activator comprises a hydrocarbyl substituted ammonium salt and the anion comprises an aryl substituted borate.

Typical borates suitable as ionic activators include:

triethylammonium tetraphenylborate
triethylammonium tetrapbenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl) borate,
N,N-diethylanilinium tetrakis(pentafluorphenyl)borate.

A preferred type of activator suitable for use with the metallocene complexes of the present invention comprise ionic compounds comprising a cation and an anion wherein the anion has at least one substituent comprising a moiety having an active hydrogen.

Suitable activators of this type are described in WO 98/27119 the relevant portions of which are incorporated herein by reference.

Particular preferred activators of this type are alkylammonium tris(pentafluorophenyl)4-(hydroxyphenyl)borates. A particularly preferred activator is bis(hydrogenated tallow alkyl)methyl ammonium tris(pentafluorophenyl)(4-hydroxyphenyl)borate.

With respect to this preferred type of ionic activator, the reaction product of an alkylammonium tris (pentaflurophenyl)-4-(hydroxyphenyl)borate and an organometallic compound, for example triethylaluminium, represents the product obtained from the aforementioned step (i).

The organometallic compound utilised in step (i) is typically chosen from those containing a metal of Groups 1–14 of the Periodic Table but preferred organometallic compounds are those of Group 13 for example those containing aluminium.

Particularly preferred organometallic compounds are organoaluminium compounds for example trialkylaluminium compounds such as trimethylaluminium, triethylaluminium or triisobutylaluminium.

Suitable support materials include inorganic metal oxides or alternatively polymeric supports may be used.

The most preferred support material for use with the supported catalysts according to the process of the present invention is silica. Suitable silicas include Crosfield ES70 and Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Alternative supports for the present invention are non-porous polystyrenes for example divinylbenzene crosslinked polystyrene.

The metallocene complex may comprise for example a traditional bisCp metallocene complex or more preferably a monocyclopentadienyl complex having a 'constrained geometry' configuration.

Particularly suitable complexes, for example, are those disclosed in WO 95/00526 the disclosure of which is incorporated herein by reference.

Preferred metallocene complexes for use in the preparation of the supported catalysts of the present invention may be represented by the general formula:

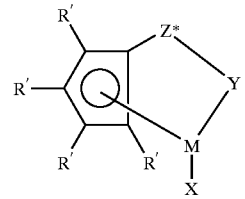

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\rightarrow^4$ bonded diene group having up to 30 non-hydrogen atoms, which forms a $\rightarrow$ complex with M;

Y is —O—, —S—, —NR*—, —PR*—,

M is titanium or zirconium in the +2 formal oxidation state;

Z* is $SiR^*_2$, $CR^*_2$, $SiR^*_2SIR^*_2$, $CR^*_2CR^*_2$, $CR^*=CR^*$, $CR^*_2SIR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\rightarrow^4$-1,4-diphenyl-1,3-butadiene, s-trans-$\rightarrow^4$-3-methyl-1,3-pentadiene; s-trans-$\rightarrow^4$-2,4-hexadiene; s-trans-$\rightarrow^4$-1,3-pentadiene; s-trans-$\rightarrow^4$-1,4-ditolyl-1,3-butadiene; s-trans-$\rightarrow^4$-1,4-bis(trimethylsilyl)-1,3-butadiene; s-cis-$\rightarrow^4$-3-methyl-1,3-pentadiene; s-cis-$\rightarrow^4$-1,4-dibenzyl-1,3-butadiene; s-cis-$\rightarrow^4$-1,3-pentadiene; s-cis-$\rightarrow^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosporhus containing groups containing a group corresponding to the formula —N(R")— or —P(Re)— wherein R" is $C_{1-10}$ hydrocarbyl.

Most preferred complexes are amidosilane- or amidoalkanediyl complexes.

Most preferred complexes are those wherein M is titanium.

Specific complexes suitable for use in the preparation of the supported catalysts of the present invention are those disclosed in the aforementioned WO 95/00526 and are incorporated herein by reference.

A particularly preferred complex for use in the preparation of the supported catalysts of the present invention is (t-butylamido)(tetramethyl-$\eta^5$-cyclopentadienyl)dimethyl silanetitanium-$\eta^4$-1,3-pentadiene.

The organometallic compound utilised in step (iv) may be the same or different to that described above. Preferred organometallic compound for step (iv) are organoaluminium compounds for example trialkylaluminium compounds such as trimethylaluminium, triethylaluminium or triisobutylaluminium.

The molar ratio of metallocene complex to ionic activator employed in the method of the present invention may be in the range 1:10000 to 100:1. A preferred range is from 1:5000 to 10:1 and most preferred from 1:10 to 10:1.

The supported metallocene catalysts of the present invention are most suitable for operation in the gas phase. Gas phase processes for the polymerisation of olefins, especially for the homopolymerisation and the copolymerisation of ethylene and α-olefins for example 1-butene, 1-hexene, 4-methyl-1-pentene are well known in the art. Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and (α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported metallocene catalyst system prepared as hereinbefore described.

The present invention will now be further illustrated with reference to the following examples:

EXAMPLES

The present invention will now be further illustrated by reference to the following examples:

Catalyst Preparation

All catalyst preparation was carried out under a nitrogen atmosphere in batch reactors. Solvents were purified by passing over molecular sieve and activated alumina.

Comparative Example 1

18 kg of raw Grace 948 silica was fluidised at 7 cm/s with nitrogen. The temperature was raised to 250° C. at a rate of 1.5° C./min. The silica was dried at 250° C. over 5 h, then cooled to room temperature at a rate of 1° C./min.

In a 240 litre reactor equipped with a 166 rpm impeller stirrer, was introduced 110 litres of hexane, 1 litre of a hexane solution containing Stadis 425 at a concentration 2.0 g/l, and 10.7 kg of the calcined silica above. After 5 minutes stirring, hexane was decanted to achieve a final slurry volume of 110 litres, then 30 litres of hexane was introduced. To this slurry at 30° C. was added quantitatively 20.3 liters of a 923 mmol Al/l hexane solution of TEA. The resulting slurry was stirred for 2 hours at 30° C. Hexane solution was decanted to leave a 110 litres of slurry, 130 litres of hexane was introduced and hexane solution was again decanted to leave 110 litres of slurry. This process was continued until aluminium in the solvent washings was <0.5 mmol/litre. The resulting slurry was transferred to a drier equipped with a stirrer/pales and volatiles were removed under reduced pressure at 60° C. to achieve a residual solvent level of <0.5% wt. To the dry silica was added 1 l of Stadis 425 as a 1.5 g/l solution in toluene and 1 litre of toluene.

To a 24 litre reactor equipped with a 300 rpm turbine stirrer, was added 2.9 litres of toluene, 3.7 kg (4.3 l) of Ionic Activator A as a 9.63% wt solution in toluene, then 1.2 kg (1.3 l) of a 250 mmol Al/l solution of TEA in toluene. The mixture was stirred for 30 minutes at 20° C. The resulting solution was transferred quantitatively at 30° C. over 2 hours to the TEA treated silica prepared above, followed by addition of a further 0.5 litres of toluene. Volatiles were removed at 35° C. under reduced pressure to achieve a residual toluene level of ca. 22–23% wt. Hexane, 60 litres, was introduced rapidly and the resulting slurry was stirred for 1 hour at 20° C. To the slurry was added Complex A, 1.6 kg of a 7.15% wt solution in heptane. The resulting slurry was stirred for 1 hour at 20° C., to which 1 l of Stadis 425 as a 2 g/l solution in hexane was added.

The above slurry was transferred to a 240 litre reactor equipped with a 166 rpm impeller stirrer, followed by addition of 70 litres of hexane. Solution was decanted to leave 110 litres of slurry, to which 150 litres of hexane was added followed by decantation to 110 litres of slurry. This process was repeated twice more and the final slurry was transferred to a drier equipped with stirrer/pales, and volatiles were removed under reduced pressure at 40° C. to get a final solvent level of ca. 1 wt %.

Example 1

In a 240 litre reactor equipped with a 166 rpm impeller stirrer, was introduced 110 litres of hexane, 1 litre of a hexane solution containing Stadis 425 at a concentration 2.0 g/l, and 10.0 kg of Grace 948 silica, supplied activated by a procedure similar to that summarised for comparative example 1. After 5 minutes stirring, hexane was decanted to achieve a final slurry volume of 110 litres, then 30 litres of hexane was introduced. To this slurry at 30° C. was added quantitatively 18.41 liters of a 980 mmol Al/l hexane solution of TEA. The resulting slurry was stirred for 2 hours at 30° C. Hexane solution was decanted to leave a 110 litres of slurry, 130 litres of hexane was introduced and hexane solution was again decanted to leave 110 litres of slurry. This process was continued until aluminium in the solvent washings was <0.5 mmol/litre. The resulting slurry was transferred to a drier equipped with stirrer/pales and volatiles were removed under reduced pressure at 60° C. to achieve a residual solvent level of <0.5% wt. To the dry silica was added 1 l of Stadis 425 as a 1.5 g/l solution in hexane and 1 litre of hexane.

To a 24 litre reactor equipped with a 300 rpm turbine stirrer, was added 2.5 litres of hexane, 4.2 kg (4.8 l) of Ionic Activator A as a 9.63% wt solution in toluene, then 2.5 kg (2.9 l) of a 250 mmol Al/l solution of TEA in toluene. The mixture was stirred for 1 hour at 20° C. The resulting solution was transferred quantitatively at 30° C. over 2 hours to the TEA treated silica prepared above, followed by addition of a further 0.5 litres of hexane, and stirring for 1 hour. To the resulting impregnated silica was added at 20° C., Complex A, 1.4 kg (1.6 l) of a 9.18% wt solution in heptane, followed by mixing for 1 hour at 20° C. A hexane solution of TEA, 60 litres of 10 mmol/l, was added to the impregnated silica, and the resulting slurry was stirred for 1 hour at 20° C. To the slurry was added Stadis 425 as a 2 g/l solution in hexane.

The above slurry was transferred to a 240 litre reactor equipped with a 166 rpm impeller stirrer, followed by addition of 70 litres of hexane. Solution was decanted to leave 110 litres of slurry, to which 150 litres of hexane was added followed by decantation to 110 litres of slurry. This process was repeated twice more and the final slurry was transferred to a drier equipped with stirrer/pales, and volatiles were removed under reduced pressure at 40° C. to get a final solvent level of ca. 1 wt %.

| Abbreviations | |
|---|---|
| TEA | triethylaluminium |
| Ionic Activator A | $[N(H)Me(C_{18-22}H_{37-45})_2][B(C_6F_5)_3(C_6H_4OH)]$ |
| Complex A | $(C_5Me_4SiMe_2N^tBu)Ti(\eta^4\text{-1,3-pentadiene})$ |

Results of the co-polymerisation of ethylene and hexene in a continuous gas phase pilot plant are summarised in the table. Hydrogen was employed as a chain transfer agent to control molecular weight.

| | | Catalyst | | | |
|---|---|---|---|---|---|
| | T °C. | $PC_2$ bar | density kg/m³ | $MI_{2.16}$ g/10 min | Productivity g/g |
| Comparative 1 | 75 | 9 | 917.3 | 0.92 | 2000 |
| Example 1 | 75 | 9 | 917.5 | 1.20 | 3400 |
| Example 1 | 75 | 15 | 917.0 | 1.32 | 5100 |

The results clearly indicate the improved productivity in the gas phase when the catalyst preparation utilises the additional further treatment with the organometallic compound.

What is claimed is:

1. A method for the preparation of a supported metallocene catalyst system said method comprising the steps of:
   (i) mixing together in a suitable solvent to form a mixture
      (a) an organometallic compound, and
      (b) an ionic activator comprising a cation and an anion,
   (ii) adding of the mixture of step (i) to a support material,
   (iii) adding to the resultant of step (ii) a metallocene complex in a suitable solvent,
   (iv) further adding an organometallic compound in a suitable solvent, and
   (v) removing solvent.

2. A method according to claim 1 wherein the organometallic compound used in step (i) is an organoaluminium compound.

3. A method according to claim 2 wherein the organoaluminium compound is a trialkylaluminium compound.

4. A method according to claim 1, 2, or 3 wherein the cation of the ionic activator comprises a hydrocarbyl substituted ammonium salt and the anion comprises an aryl substituted borate.

5. A method according to claim 1, 2, or 3 wherein the ionic activator comprises an ionic compound having a cation and an anion wherein the anion has at least one substituent comprising a moiety having an active hydrogen.

6. A method according to claim 5 wherein the ionic activator is an alkylammonium tris(pentafluorophenyl) 4-(hydroxyphenyl) borate.

7. A method according to claim 6 wherein the ionic activator is bis (hydrogenated tallow alkyl) methyl ammonium tris (pentafluorophenyl)(4 -hydroxyphenyl) borate.

8. A method according to claim 1 wherein the support material is an inorganic oxide.

9. A method according to claim 8 wherein the inorganic oxide is silica.

10. A method according to claim 9 wherein the silica has been pretreated with an organometallic compound.

11. A method according to claim 1 wherein the metallocene complex is a constrained geometry complex.

12. A method according to claim 1 wherein the metallocene complex has the general formula:

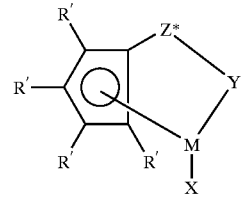

wherein:
R' each occurrence is independently selected from the group consisting of hydrogen, hydrocarbyl, silyl, germyl, halo, cyano, and combinations thereof, said R' having up to 20 non-hydrogen atoms, and optionally, two R' groups (where R' is not hydrogen, halo or cyano) together form a divalent derivative thereof connected to adjacent positions of the cyclopentadienyl ring to for a fused ring structure;

X is a neutral $\to^4$ bonded diene group having up to 30 non-hydrogen atoms, which forms a $\to$ complex with M;

Y is —O—, —S—, —NR*—, —PR*—,

M is titanium or zirconium in the +2 formal oxidation state; and

Z* is $SiR^*_2$, $CR^*_2$, $SiR^*_2SIR^*_2$, $CR^*_2CR^*_2$, $CR^*=CR^*$, $CR^*_2SIR^*_2$, or $GeR^*_2$, wherein:

R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

13. A method according to claim 12 wherein M is titanium.

14. A method according to claim 13 wherein the metallocene complex is (t-butylamido) (tetramethyl-$\to^5$-cyclopentadienyl) dimethyl silanetitanium -$\to^4$-1.3-pentadiene.

15. A method according to claim 1 wherein the molar ratio of the metallocene complex to the ionic activator is in the range 1:10000 to 100:1.

16. A method according to claim 15 wherein the range is from 1:10 to 10:1.

17. A method accord to claim 1 wherein the organometallic compound used in step (iv) is the same as the organometallic compound used in step (i).

18. A method according to claim 1 wherein the organometallic compound used in step (iv) is different than the organometallic compound use in step (i).

19. A method according to claim 17 or 18 wherein the organometallic compound used in step (iv) is an organoaluminium compound.

20. A method according to claim 19 wherein the organoaluminum compound is a trialkylaluminium compound.

21. A process for the polymerization of ethylene or the copolymerization of ethylene an α-olefins having from 3 to 10 carbon atoms, said process being performed under polymerization conditions in the presence of a supported metallocene catalyst system prepared according to claim 1.

22. A process according to claim 21 wherein the polymerization is performed in the gas phase.

* * * * *